(12) United States Patent
Stulski (10) Patent No.: US 7,886,278 B2
(45) Date of Patent: Feb. 8, 2011

(54) OBJECT REFERENCE MONITORING

(75) Inventor: Vitaliy Stulski, San Matco, CA (US)

(73) Assignee: SAP AG, Walldorf (DE)

( * ) Notice: Subject to any disclaimer, the term of this patent is extended or adjusted under 35 U.S.C. 154(b) by 1136 days.

(21) Appl. No.: 11/224,782

(22) Filed: Sep. 12, 2005

(65) Prior Publication Data

US 2007/0061739 A1 Mar. 15, 2007

(51) Int. Cl.
  *G06F 9/44* (2006.01)
(52) U.S. Cl. .............. 717/127; 717/120; 717/121; 717/125; 717/131
(58) Field of Classification Search ......... 717/120–121, 717/125, 127–131
See application file for complete search history.

(56) References Cited

U.S. PATENT DOCUMENTS

| | | | |
|---|---|---|---|
| 6,282,701 B1 * | 8/2001 | Wygodny et al. ........... | 717/125 |
| 6,681,990 B2 | 1/2004 | Vogler et al. | |
| 7,043,718 B1 * | 5/2006 | Au et al. ..................... | 717/127 |
| 2003/0131343 A1 * | 7/2003 | French et al. ............... | 717/127 |
| 2004/0078684 A1 * | 4/2004 | Friedman et al. ............. | 714/38 |
| 2005/0240904 A1 * | 10/2005 | Isakov et al. ................ | 717/128 |
| 2005/0261879 A1 * | 11/2005 | Shrivastava et al. ......... | 702/186 |
| 2006/0123395 A1 * | 6/2006 | Andrews et al. ............ | 717/127 |

OTHER PUBLICATIONS

Bogner—25 pages—Insight Consulting Partners—Wage Type Processing Basic Concepts.

* cited by examiner

*Primary Examiner*—H. S. Sough
*Assistant Examiner*—Carina Yun
(74) *Attorney, Agent, or Firm*—Blakely Sokoloff Taylor & Zafman (57) ABSTRACT

A system and method for object reference monitoring. In one embodiment of the invention, a method includes running a computer application, monitoring a configuration point of the computer application during runtime, determining that a program object is accessed by the computer application at the configuration point, and storing data regarding the program object.

19 Claims, 5 Drawing Sheets

OBJECT REFERENCE MONITORING

TECHNICAL FIELD

Embodiments of the invention generally relate to the field of computer applications and, more particularly, to a system and method for object reference monitoring.

BACKGROUND

In the development and support phases for computer application software, configurations often require modifications as processes and circumstances change. In a complex system for a large organization, changes may occur frequently, thereby requiring frequent changes in its configuration that may result in significant changes in output data objects.

In the operation of a computer application, various different program objects or references to program objects may be manipulated by application code or enter a configuration point of the application. However, the identity of the program objects or references to such objects often will not be known at the time of generating the configuration. This issue may be exasperated if the configuration point includes a flexible interface, such as a web service, that can potentially be used in many different ways from many different systems.

If it is not possible to predict what program objects will enter a computer application during an eventual run, a developer operating in a conventional development environment system may not anticipate what will occur when the application is run. The entry of program objects that were not anticipated by the developer or user may have consequences that were not addressed in the generation of the configuration. The conventional static development of the configuration will not provide the developer with sufficient information to deal with all possible scenarios, and thus the configuration may not correctly handle programs objects that enter configuration points or properly design configuration points. With sufficient information, configuration points may not include needed filters, processing blocks or limitations to prevent access by objects that should not be processed by the configuration and to allow objects that should be processed.

SUMMARY OF THE INVENTION

A system and method for object reference monitoring are described.

According to an embodiment of the invention a method includes running a computer application, monitoring a configuration point of the computer application during application runtime, determining that a program object has been accessed by the computer application at the configuration point, and storing data regarding the program object in a storage.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for object reference monitoring.

As used herein, "Web service" means a software application assessable in a web environment. Web service includes the term as used by the World Wide Web Consortium (W3C) in applicable standards.

As used herein, "configuration point" means a place or location in control flow of an application that is exposed or available to an end user. A configuration point may include a point that may be used in tuning of an application by means of changing settings that control the flow of the application.

As used herein, "configuration object" means an object that contains configuration data that is exposed or available to the end user of an application. In an example, the configuration data is data that is used to control how the configuration object will be processed by the application.

As used herein, "application object" means a self-contained program entity. An application object may include internal data, configuration data, and procedures to manipulate the data based on an existing configuration.

As used herein, "data capture" means a process of collection of program object information. Data capture may include capture of internal data and references to other program objects.

Computer applications often address unforeseen events during runtime. For, the developer of the application often cannot foresee all possible program objects that may enter or be accessed by the computer application. Information regarding all relevant potential objects often is not available to the developer when a system is configured.

In an embodiment of the invention, a system provides for monitoring of configuration points of a computer application during the running of the computer application to collect object information. In one embodiment, a system allows a developer who is reconfiguring an application to access the object information that has been captured by a monitoring system during one or more previous runs of the configured application. In one embodiment, a dynamic configuration process provides the runtime data that has been collected concerning relevant program objects.

In one embodiment of the invention, a system provides monitoring that captures and stores object data in real time operation. The system makes such data available for the developer for use in future configuration operations. In one embodiment, a process of configuration modification includes real time reference and dependency checking based on collected data. In one embodiment, the configuration system automatically captures and stores the referenced information during runs of an application. In one embodiment, a configuration system automatically notifies a developer when data is available regarding a configuration point that is being modified.

In an embodiment of the invention, object information is collected and provided for the purpose of simplifying and improving further configuration modification. In an embodiment, the object information produced by data collected is then stored in a centrally available location to allow ease of access for those involved in configuration operations. The object information can be used in analysis of application operation, such as in change consistency analysis that is required prior to releasing changes to the run-time environment.

In an embodiment of the invention, a configuration monitoring system may be used for multiple different types of development, including development of standard object oriented applications, configuration maintenance, and development of newer types of application interfaces, such as web services. The configuration monitoring system may be particularly useful in a distributed computing environment because the system collects run-time data that is difficult to predict and makes such data available to multiple developers who may not be aware of the details of past system operations. In one embodiment of the invention, a developer who is creating or modifying a class of objects and handling routines for the class of objects may utilize captured knowledge regarding which real-time objects could be passed to the configuration point being modified, and thereby may build in necessary operations and safeguards to deal with desired program objects and to prevent access by undesired objects.

In one embodiment of the invention, a configuration monitoring and development process may include, but is not limited to:

(1) Running a present configuration of an application;

(2) Capturing relevant data regarding objects or references that enter particular configuration points for the application;

(3) Binding the collected data to the configuration points or to the source code; and (4) Displaying results to a developer when the developer accesses the configuration points for modification.

In the embodiment, a process is provided for a monitoring application operation and then storing the monitoring data for use in further development. In an embodiment, the collected data may be used later in a software developer's work on a configuration for the same application. The collected data is available to inform the developer about possible problems that could be triggered by dynamic operational characteristics. In an embodiment of the invention, the system may potentially simplify configuration maintenance, reduce the number of errors or problems that result from changing a configuration point, and minimize the need for low level debugging activities.

Software development work may occur in various different environments, include operations in an IDE (integrated development environment) such as Eclipse, Microsoft Visual Studio, SAP NetWeaver Studio, or Delphi, or while making configuration changes in environments such as SAP ERP system. In any such development, an application configuration may include functions or configuration points that accept real time characteristics or program objects that are not available or known at design time. In such cases, a determination of all possible values and types of such objects' reference points and their characteristics is not possible without obtaining run-time information. Without such information, a developer is unable to completely predict what objects will enter during the eventual configuration run, which thus makes it difficult to handle all possible situations, and thus makes the resulting configuration point error prone. In an embodiment of the invention, a developer who is creating or modifying a configuration point, including, for example, a class of objects and handling routines, is provided with knowledge about real-time objects that could be passed to the configuration point that is being modified.

In one particular example, a monitoring system may address a large enterprise, such as a payroll system. In this example, program objects may include wage types for individuals. Run-time information about wage type program objects entering particular configuration points (including, for example relevant schemas and rules) is collected and is bound to code and configuration editors in a form of error reporting decorations (underlines, icons, alerts) where a configuration object is invalid for a processing routine. A configuration operation may include code generators (tools that generate code such as state handling routines based on run-time characteristics of wage types) and other coding assistants. An embodiment of the invention will inform a developer who is changing a configuration point about the actual magnitude of the impact of potential changes on a system, which thereby may improve and streamline configuration by reducing the number of coding errors.

Embodiments of the invention may be implemented in various different types of interfaces, including newer types of application interfaces, such as web services. In general, a web service provides a software system designed to support interoperable machine-to-machine interaction over a network. Web services conform to certain standards and thus provide a means of communication between applications on different platforms. Web services provide a mechanism for applications to communicate and interrelate in a platform independent fashion. Under an embodiment of the invention, a web service interface is implemented in a J2EE (Java 2 Platform, Enterprise Edition) platform, with the J2EE platform being described in the appropriate J2EE specification, including as provided in version 1.4, Nov. 24, 2003.

Web services are compatible with many different systems and thus can be made available to a very broad audience. An original developer cannot anticipate all objects that may enter the web service application system when the application is run. In order to prepare the code so that it includes needed limits and recognizes the type and attributes of objects that should be permitted, an embodiment of the invention produces data that can inform the developer regarding potential objects entering the web service interface. The developer may apply such data to modify the original code in a newly developed application to handle the possibilities inherent in web services. An embodiment of a system allows monitoring of objects and the provision and maintenance of information for a developer who is in the process of writing a particular type of code, and thus the system assists the developer in managing and maintaining references over time. Because web services are potentially available for users worldwide, it becomes even more important to prepare application code so that it both sets up limits and also recognizes the types of objects to be permitted. An embodiment of the invention can inform the developer so that the code in an application is structured to handle possibilities inherent in web services. In this manner, more secure web services can be generated.

Under an embodiment of the invention, run-time data that is subject to data capture from the monitoring of configuration points may be stored in various locations, including a local storage for a developer or in a central database to allow broader use of the information. In one embodiment, a central data repository can be established and then is available for use by a group of developers to store enterprise-wide information about configuration points and objects entering them. The stored information collected from application runs is available for future code or configuration modifications.

In embodiments of the invention, the stored data may be provided to developers in various forms. The data may be stored and made available to a developer who wishes to research prior configuration runs with regard to a configuration point. In another example, relevant stored data is automatically provided to developers. In one embodiment of the invention, the data is automatically pulled from the storage when configuration points are addressed and displayed via an interface for the developers. In this embodiment the stored information is bound with or linked to the relevant configuration point, and an access to such stored information automatically triggers a retrieval of the information.

In an embodiment of the invention, the establishment of a monitoring system includes developing a description of data collection points to be monitored and the parameters for program objects that will be collected. For example, collected data may include function code in general purpose languages like Java, C or C++, or general routine calls in $4^{th}$ generation language, such as ABAP (Advanced Business Application Programming of SAP AG). Scripting languages (including both open source and proprietary languages) could serve as collection points. One or more parameters, including parameters that are explicitly passed and parameters that are implicitly passed, could serve as arguments for any collection point. The exact nature and contents of these objects may or may not be available at design time. An embodiment of the invention informs a developer of the possible combinations when the developer is doing appropriate configuration or source code changes. Those parameters should be captured for each, or selected by a rule collection point hit. An embodiment of the invention includes a process to allow developers to observe and collect functions or configurations that accept real time characteristics or objects.

Figure 1:
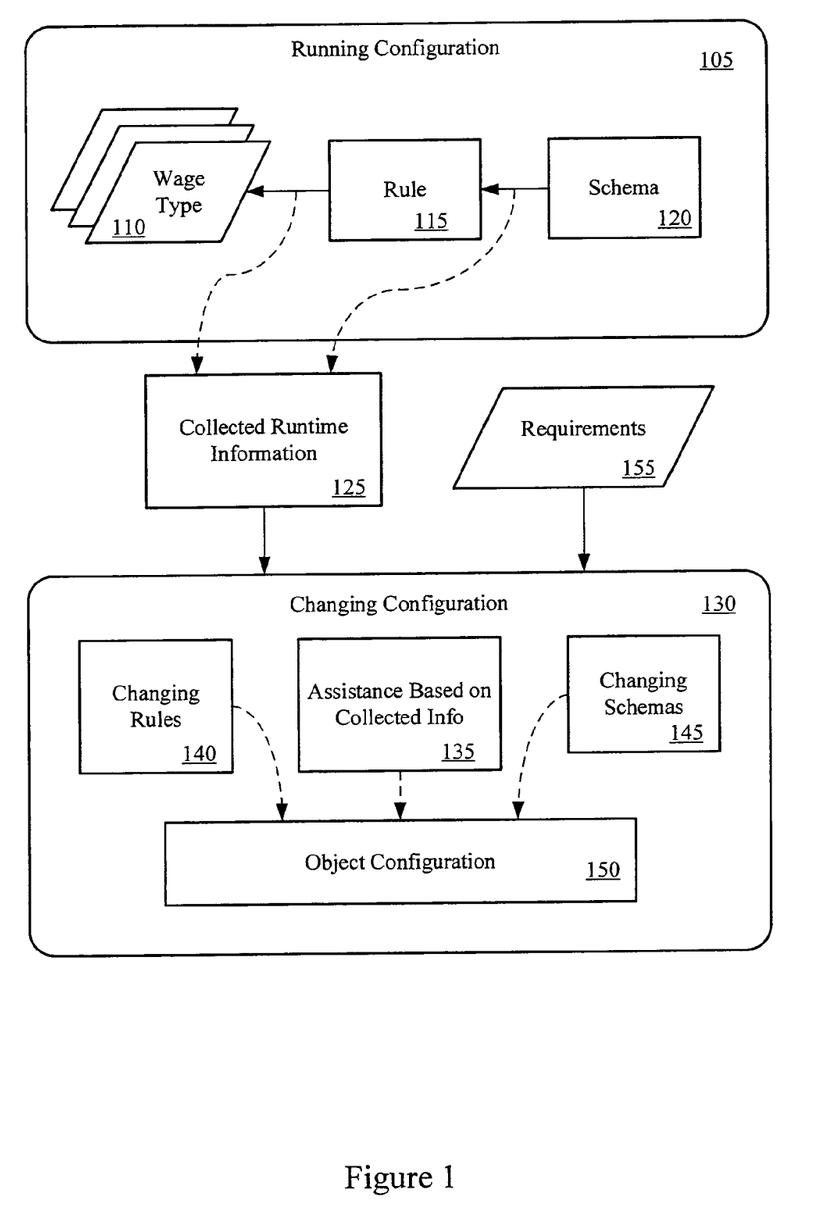
FIG. 1 is an illustration of illustration of an embodiment of object reference monitoring.

FIG. 1 is an illustration of an embodiment of object reference monitoring. In this figure, a process is illustrated for an example of wage processing for an enterprise. In this example, a system utilizes wage types, schemas, and rules. In this example, wage types are program object classes and have characteristics that affect processing. The wage types may have references to other wage types. When a particular wage type is assigned to an employee of the enterprise, an instance of the wage type is generated, with the instance containing certain characteristics that are relevant for the individual. In a process for running a particular configuration 105 multiple wage type instances 110 are illustrated. A payroll schema 120 defines a work flow for fetching wage types, processing the wage types, and recording the processing results. A payroll rule 115 then is a small program to define an operation, such as calculation, transformation, or checking algorithms, or to provide some dynamic flow behavior to a schema. Multiple different rules may be relevant to a schema. A particular payroll rule may operate on multiple wage types. Payroll schemas and rules are examples of configuration points in the payroll application, and thus are points that are exposed to the end user of the application.

In this example, the configuration process for the payroll consists of configuring the wage type characteristics that affect schemas and rules, and modifying workflow and calculation algorithms that operate on wage types and depend on their characteristics. A particular enterprise may potentially have large numbers of defined wage types and custom wage types, and large number of schemas and rules that operate on these wage types.

In the configuration of the payroll system, there may be frequent modifications to configuration points such as rules and schemas. However, it likely is unclear during the configuration process what wage types will be entering these configuration points. Further, the system is constantly in flux as new wage types are created and as the existing wage types are modified. The process of configuring such an operation and troubleshooting the system when incorrect results occur is a complex and expensive process in conventional operations.

In an embodiment of the invention, data is collected regarding wage types entering particular configuration points (schemas and rules) during run-time to provide a source of data for future configuration efforts. During the running of the operation in a particular configuration 105, such runtime information is collected and stored 125. The information produced by data collection may be stored in various locations, including a central data storage. During a subsequent process of changing the configuration 130, the collected run-time information 125 can be used in conjunction with configuration requirements 155 for the new configuration 150 to produce an improved configuration product. The configuration modification may include changing rules 140 and changing schemas 145. In one embodiment, the configuration system will retrieve the prior runtime information 125 when these configuration points are addressed in the reconfiguration process. The information will include data regarding the wage types 110 that were encountered by the configuration points in prior runs of the configuration. The data may produce configuration assistance or guidance 135. The collected data may be utilized to correct a configuration and to attempt to address any difficulties connected with the wage types that are addressed by the application. The changes may include, for example, correcting rules to provide proper processing of the wage types, or modifying certain limits or filters for the configuration points to prevent operations from occurring on wage types that should be excluded.

Figure 2:
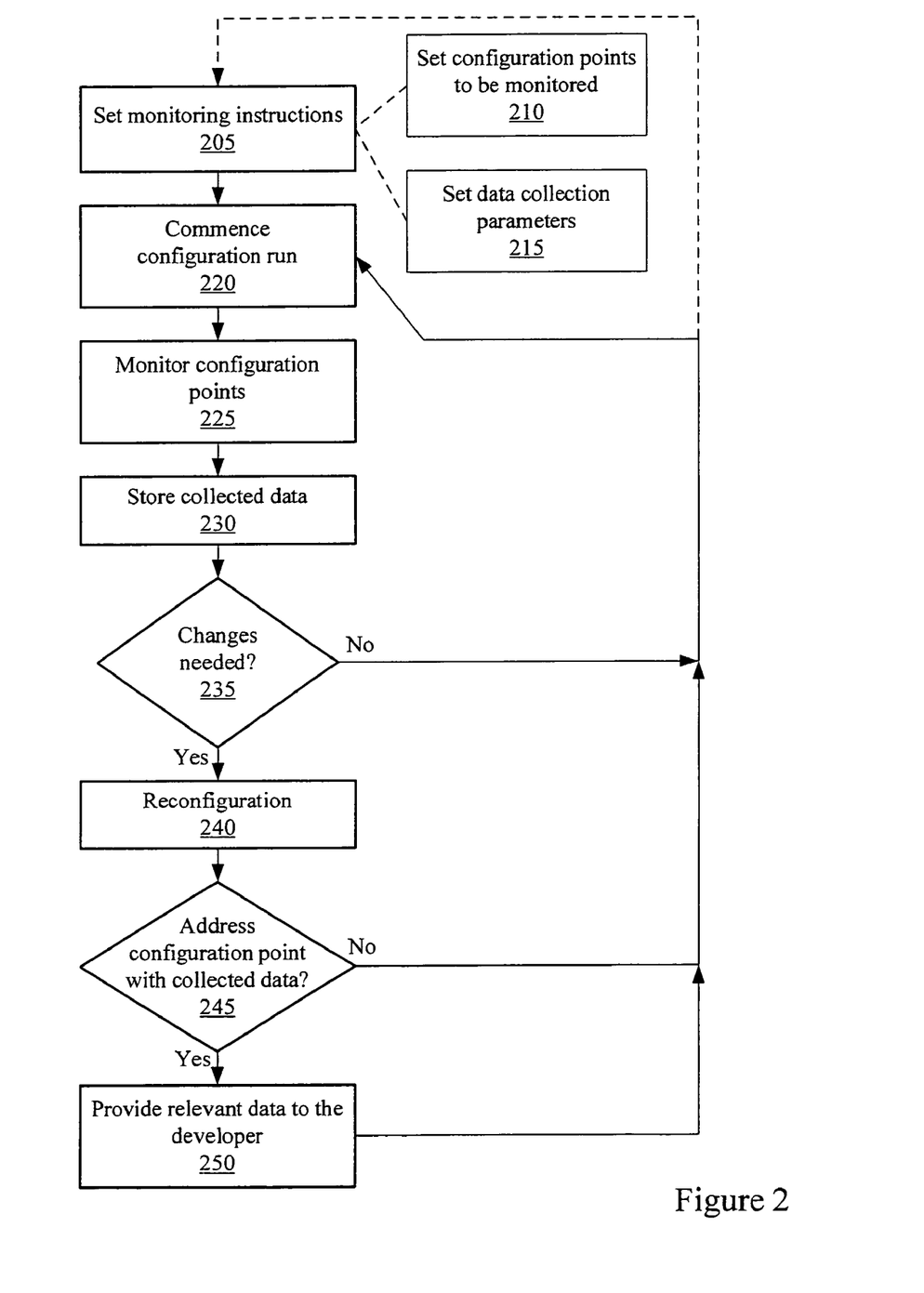
FIG. 2 is a flow chart to illustrate an embodiment of configuration processes using object reference monitoring.

FIG. 2 is a flow chart to illustrate an embodiment of configuration processes using object reference monitoring. In this illustration, monitoring instructions may be set 205, which may include setting configuration points to be monitored 210 and setting data collection parameters 215. A configuration run is then commenced 220, and during the run the configuration points are monitored for objects that enter such points 225. The data regarding objects is stored 230, with the location of storage varying with the particular embodiment. This process can continue with subsequent application runs. At the conclusion of the run, changes may be needed in the configuration 235. If changes are required, a reconfiguration process is commenced 240. In reconfiguration, if a configuration point is addressed for which runtime data has been stored 245, the relevant data is provided to the developer 250. The developer then may use the data to improve the configuration. The process then returns to further configuration runs 220, or to changes in monitoring instructions if needed 205. As multiple iterations of an application are run, the configuration can be fine tuned to attempt to correctly address each object that enters a configuration point.

Figure 3:
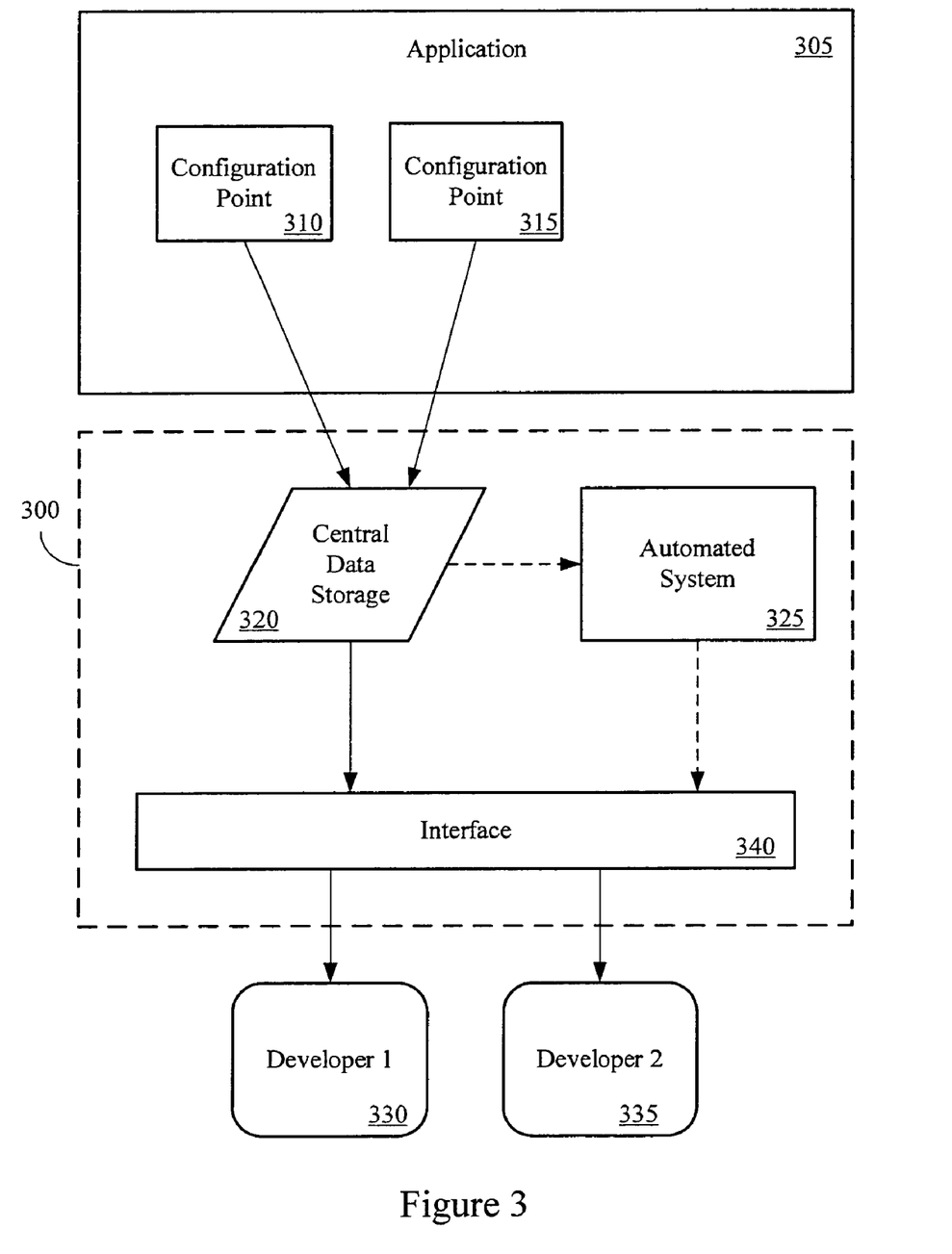
FIG. 3 is an illustration of a system to provide object reference monitoring.

FIG. 3 is an illustration of a system to provide object reference monitoring. In one embodiment, a particular application 305 includes various configuration points 310 and 315. In an example, the configuration point may include schemas and rules that act on program classes. However, when the application is run, it may be difficult to predict what program objects will enter the configuration points. In an embodiment, a system 300 provides for collecting and providing information to improve configuration processing. When the application has been configured and run, data is collected from the configuration points 310 and 315 and is stored, such as in a central data storage 320. The central data storage is available to developers of the application, such as developer 1 330 and developer 2 335 in the illustration, via an interface 340. The developers can utilize the data from the configuration points 310 and 315 that has been stored in the central data storage 320 to determine, among other facts, what objects have entered the configuration points. Armed with this information, the developers 330-335 can, together or separately, work on future configurations that will properly address the programs objects that may enter the relevant configuration objects in subsequent runs. In one embodiment, a system 300 may include an automated system 325 to assist in configuration development. The automated system 325 may automatically provide relevant information from the central data storage regarding past runs of the application when a configuration point is addressed in configuration. The received data may then be used to reduce errors and improve development efforts.

Figure 4:
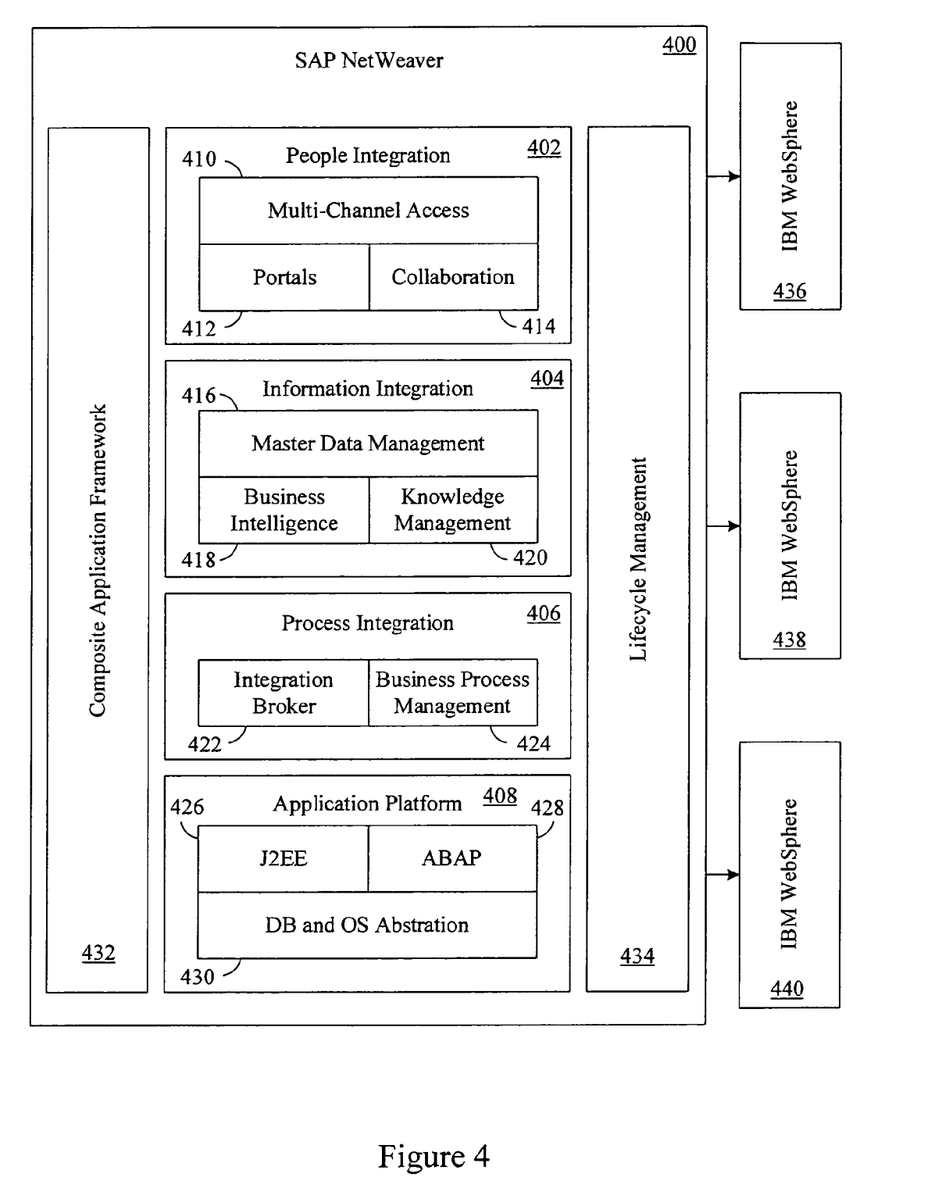
FIG. 4 is a diagram illustrating an embodiment of a system architecture.

FIG. 4 is a diagram illustrating an embodiment of a system architecture. In one embodiment, the diagram illustrates core components of the SAP NetWeaver architecture 400, in which a web service interface for external management may be implemented. The system architecture 400 comprises various SAP platforms that are merged together to provide the integration of people, information, and processes in one solution. The architecture 400 includes people integration 402, information integration 404, process integration 406, and an application platform 408.

People integration 402 is performed using a portal solution 412 and a platform to work in collaboration 414. Users are provided a multi-channel access 410 to ensure mobility. Examples of the portal solution 412 include SAP Enterprise Portal, SAP Mobile Engine, and Collaboration Package for SAP Enterprise Portal. Information integration 404 refers to the conversion of information into knowledge. Information integration 404 provides efficient business intelligence 418 and knowledge management 420 using, for example, SAP products such as Business Information Warehouse (BW) and Knowledge Management (KM). Further, consolidation of master data management beyond system boundaries is performed using SAP's Master Data Management (MDM) 416. Process integration 406 refers to optimized process management using integration broker or SAP exchange infrastructure 422 and business process management 424 techniques. Examples of products to perform process integration 406 include Exchange Infrastructure (XI) and Business Process Management (BPM).

An application platform 408 may include SAP's Web Application Server (Web AS), which is the basis for SAP applications. Web AS, which may be independent of the database and operating system 430, includes a J2EE engine 426 in combination with the proprietary SAPABAP (Advanced Business Application Programming) engine or instance 428 to further enhance the application platform 408. In one embodiment, the application platform 408 includes operation of a web service to provide an interface for heterogeneous external clients to manage systems provided by the application platform 408. In one embodiment, the application platform 408 includes a process for data collection of object reference data during application runtime to assist in modification of the configuration for the application.

The architecture 400 further includes a composite application framework 432 to provide various open interfaces (APIs—application program interface) and a lifecycle management 434, which is an extension of a previously existing transport management system (TMS). As illustrated, the architecture 400 further provides communication with Microsoft.NET 436, International Business Machine (IBM) WebSphere 438, and other such systems 440.

Figure 5:
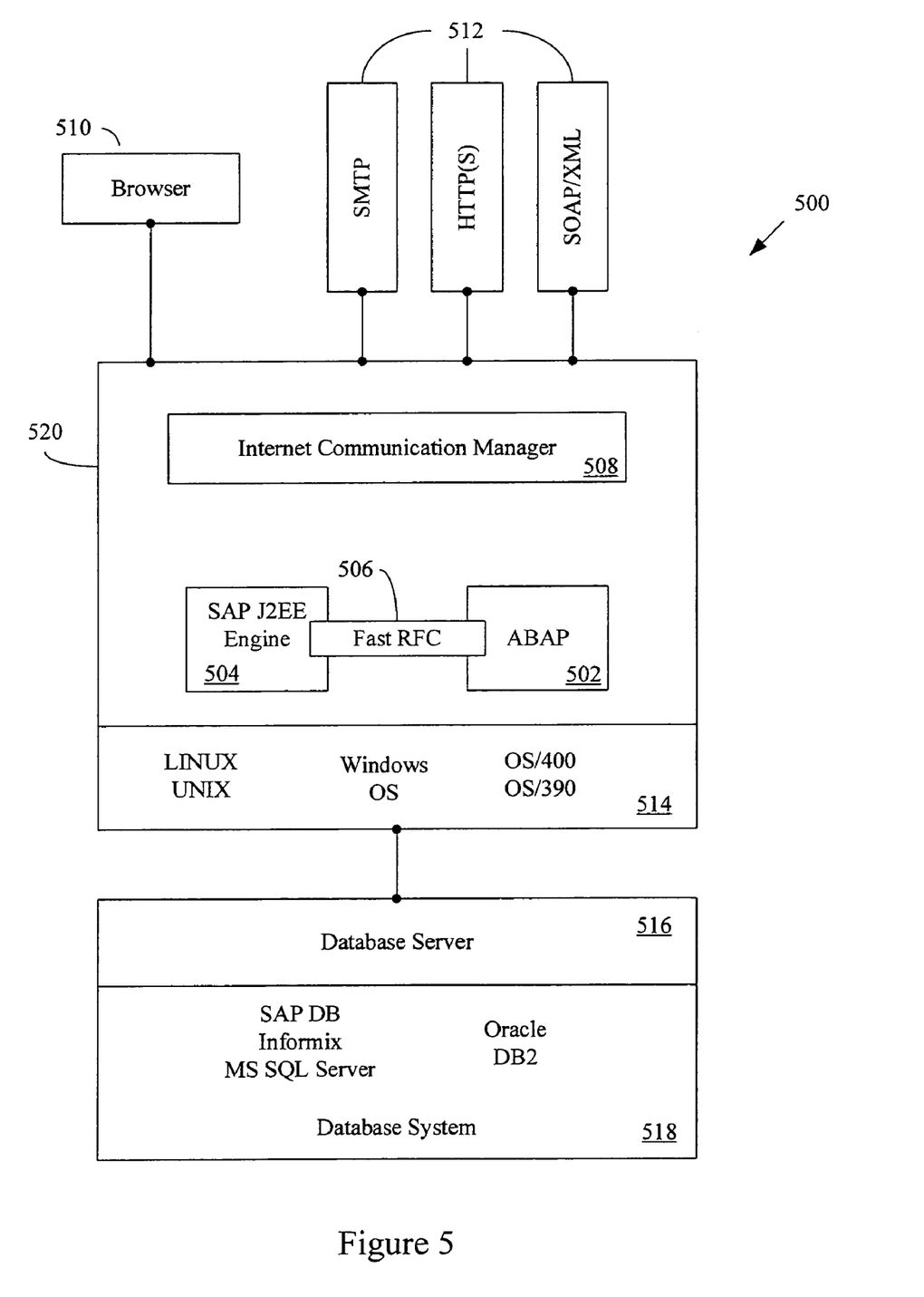
FIG. 5 is a block diagram illustrating an embodiment of an architecture including a web application server.

FIG. 5 is a block diagram illustrating an embodiment of an architecture including a web application server. In this illustration, an architecture 500 serves as an application platform (which may be, for example, the application platform 408 of provided in FIG. 4) for SAP NetWeaver and other SAP products. The architecture 500 includes a web application server 520 having, for example, an ABAP program engine 502, which provides the ABAP development and runtime environment, with the dependability, scalability, and inter-process independence of operating systems 514 and database systems 518. The operating system 514 may include LINUX, UNIX, Windows, OS/390, OS/400, and other such operating systems. The database system 518 may include SAP database (SAP DB), Informix, Oracle, DB2, and other such database systems. The database system 518 is based on a database server 516, such as Microsoft Sequential Query Language (MS SQL) server.

The web application server 520 with ABAP engine 502 further includes a J2EE program engine 504. The J2EE program engine 504 may support one or more program instances. In this example, the J2EE engine 504 may be in communication with the ABAP engine 502 via a fast remote function call (RFC) connection 506. The ABAP engine 502 and the J2EE engine 504 are further in communication with an Internet communication manager (ICM) 508. The ICM 508 is provided for handling and distributing queries to various individual components of the architecture 500. The architecture 500 further supports a browser 510, such as Microsoft Internet Explorer, Netscape Navigator, and other modified variations of mobile end devices, such as personal digital assistants (PDAs), pocket computers, smart cell phones, other hybrid devices, and the like. The web application server 520 also supports various protocols and standards 512, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 512 include SOAP and XML for the operation of web service to provide an interface for external management of systems on the web application server 520. In one embodiment, the architecture 500 provides for the collection of object reference data during application runtime to assist in modification of the configuration for the application.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for configuration monitoring comprising:
   establishing instructions for monitoring a computer application, wherein the instructions include identification of one or more configuration points of the computer application that are to be monitored and identification of parameters that are to be collected in monitoring, the configuration points being points in the computer application including settings for control of computer application processing, wherein each of the one or more configuration points is a schema or a rule;
   running the computer application;
   monitoring the one or more configuration points of the computer application during runtime, the monitoring including monitoring of program objects that are accessed by the one or more configuration points;
   determining that one or more program objects are accessed by the computer application at a first configuration point of the one or more configuration points during the running of the computer application;
   storing data that is collected regarding the one or more program objects that are accessed by the computer application at the first configuration point during the running of the computer application, wherein the collected data is stored in a central repository that is accessible to multiple developers for the computer application, and wherein the stored data includes information regarding types of the one or more program objects that were encountered by the first configuration point in the running of the computer application;
   upon concluding the running of the computer application, receiving a request to modify a setting of the first configuration point in a reconfiguration of the computer application; and
   automatically retrieving and displaying the collected data regarding the one or more program objects in response to the request to modify the first configuration point.

2. The method of claim 1, further comprising using the stored data to generate a new configuration of the computer application.

3. The method of claim 1, further comprising binding the collected data to the first configuration point.

4. The method of claim 1, wherein the access of the one or more program objects by the first configuration point during the running of the computer application is unknown at the time the computer application is configured.

5. The method of claim 1, wherein the settings of the one or more configuration points are used in the tuning of the computer application to control flow of the computer application.

6. The method of claim 1, wherein each type is a class of program objects, and wherein the collected data that is provided includes information regarding the classes of program objects encountered by each schema or rule.

7. A system comprising:
   a processor to execute computer applications;
   a component to monitor one or more configuration points of a computer application during runtime of the computer application, the monitoring including monitoring of program objects that are accessed by the one or more configuration points, the component to detect when a first program object enters a first configuration point of the computer application during execution by the processor, wherein the system is to establish instructions for monitoring of the computer application by the component, the instructions including identification of the one or more configuration points that are to be monitored and identification of parameters that are to be collected in monitoring, the configuration points being points in the computer application including settings for control of computer application processing, wherein each of the one or more configuration points is a schema or a rule;
   a computer memory including a data storage to store data that is collected regarding one or more program objects entering the configuration point during execution of the computer application, the data storage being a central repository that is accessible to multiple developers for the computer application, wherein the collected data includes information regarding types of the one or more program objects encountered by the first configuration point during execution of the computer application; and
   an interface to provide access to the data storage;
   wherein subsequent to the running of the computer application the system is to retrieve a request to modify a setting of the first configuration point in a reconfiguration of the computer application, and is to automatically obtain and display the collected data regarding the one or more program objects in response to the request to modify the first configuration point.

8. The system of claim 7, wherein data from the data storage is accessible via the interface.

9. The system of claim 7, wherein the data storage is a local storage for an application developer.

10. The system of claim 7, wherein the data is collected in run-time operation of the computer application.

11. The system of claim 7, wherein the system is to collect data regarding operation of a web service.

12. The system of claim 7, wherein the system operates in a Java environment.

13. The system of claim 7, wherein the settings of the one or more configuration points are used in the tuning of the computer application to control flow of the computer application.

14. The system of claim 7, wherein each type is a class of program objects, and wherein the collected data that is provided includes information regarding the classes of program objects encountered by each schema or rule.

15. A configuration apparatus comprising:
   a processor for execution of computer applications;
   one or more monitors for the collection of data regarding one or more configuration points of a computer application during runtime of the computer application, the monitoring including monitoring of program objects that are accessed by the one or more configuration points, wherein the apparatus is to establish instructions for monitoring of the computer application by the one or more monitors, the instructions including identification of one or more configuration points that are to be monitored and identification of parameters that are to be collected in monitoring, the configuration points being points in the computer application including settings for control of computer application processing, wherein each of the one or more configuration points is a schema or a rule;
   a computer memory including a data repository for the collected data, wherein the collected data includes information regarding types of the one or more program objects that were encountered by a first configuration point in running the computer application; and
   an interface for configuration of the computer application, subsequent to the running of the computer application the interface to receive a request to modify a setting of the first configuration point in a reconfiguration of the computer application, the interface to automatically obtain and display data from the data repository regarding the one or more program objects encountered by the first configuration point to a user in response to the request to modify the first configuration point.

16. The apparatus of claim 15, wherein the apparatus binds collected data regarding the first configuration point to the first configuration point.

17. The apparatus of claim 15, wherein the apparatus collects data for a plurality of configuration iterations for the computer application.

18. The configuration apparatus of claim 15, wherein the settings of the one or more configuration points are used in the tuning of the computer application to control flow of the computer application.

19. The configuration apparatus of claim 15, wherein each type is a class of program objects, and wherein the collected data provided that is includes information regarding the classes of program objects encountered by each schema or rule.

* * * * *